(12) United States Patent
Bowen

(10) Patent No.: US 6,725,990 B2
(45) Date of Patent: Apr. 27, 2004

(54) TORQUE TRANSFER CLUTCH WITH MAGNETORHEOLOGICAL ACTUATOR AND BALL SCREW OPERATOR

(75) Inventor: Thomas C. Bowen, Rochester Hills, MI (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 10/349,469

(22) Filed: Jan. 22, 2003

(65) Prior Publication Data

US 2003/0155201 A1 Aug. 21, 2003

Related U.S. Application Data

(60) Provisional application No. 60/358,341, filed on Feb. 19, 2002.

(51) Int. Cl.[7] .......................... F16D 27/112; F16H 37/06
(52) U.S. Cl. ............................. 192/35; 192/21.5; 192/57
(58) Field of Search ........................... 192/35, 21.5, 57, 192/70.2; 180/247; 74/665 GF

(56) References Cited

U.S. PATENT DOCUMENTS

| | | | | |
|---|---|---|---|---|
| 2,091,268 A | * | 8/1937 | Colman | 192/40 |
| 4,895,236 A | | 1/1990 | Sakakibara et al. | |
| 5,199,325 A | * | 4/1993 | Reuter et al. | 74/335 |
| 5,323,871 A | | 6/1994 | Wilson et al. | |
| 5,358,084 A | | 10/1994 | Schramm | |
| 5,407,024 A | | 4/1995 | Watson et al. | |
| 5,462,496 A | * | 10/1995 | Dick et al. | 475/204 |
| 5,779,013 A | | 7/1998 | Bansbach | |
| 5,915,513 A | | 6/1999 | Isley, Jr. et al. | |
| 6,167,997 B1 | * | 1/2001 | Keeney | 192/40 |
| 6,318,531 B1 | | 11/2001 | Usoro et al. | |
| 6,412,618 B1 | | 7/2002 | Stretch et al. | |
| 6,428,441 B1 | | 8/2002 | Hunt | |
| 6,454,674 B1 | | 9/2002 | Krzesicki et al. | |
| 6,484,857 B2 | * | 11/2002 | Vonnegut et al. | 192/35 |

FOREIGN PATENT DOCUMENTS

EP            0940286 A2  *  9/1999

* cited by examiner

*Primary Examiner*—Saul Rodriguez
(74) *Attorney, Agent, or Firm*—Harness, Dickey & Pierce P.L.C.

(57) ABSTRACT

A transfer clutch includes a magnetorheological actuator which controls operation of a ball screw operator for controlling the magnitude of clutch engagement force exerted on a multi-plate clutch assembly that is operably disposed between an input member and an output member. The magnetorheological actuator includes an electromagnetic coil, and a rotor having a first segment retained in a sealed chamber filled with magnetorheological fluid. The ball screw operator includes a threaded screw mounted on the output member and which is splined to a second segment of the rotor, a threaded nut, a plurality of balls retained between the aligned threads of the screw and nut, and a drag spring providing a predetermined drag force between the screw and the output member. The multi-plate clutch assembly includes a drum driven by the input member, a hub driving the output member, and a clutch pack operably disposed between the drum and hub.

33 Claims, 7 Drawing Sheets

TORQUE TRANSFER CLUTCH WITH MAGNETORHEOLOGICAL ACTUATOR AND BALL SCREW OPERATOR

CROSS-REFERENCE TO RELATED APPLICATIONS

This application claims the benefit of U.S. Provisional Application No. 60/358,341, filed on Feb. 19, 2002. The disclosure of the above application is incorporated herein by reference.

FIELD OF THE INVENTION

The present invention relates generally to power transfer systems for controlling the distribution of drive torque between the front and rear drivelines of a four-wheel drive vehicle. More particularly, the present invention is directed to a transfer clutch adapted for use in motor vehicle driveline applications having a magnetorheological clutch actuator that is operable for controlling actuation of a ball-screw operator associated with a multi-plate clutch assembly.

BACKGROUND OF THE INVENTION

In view of increased demand for four-wheel drive vehicles, a plethora of power transfer systems are currently being incorporated into vehicular driveline applications for transferring drive torque to the wheels. In many vehicles, a transfer case is interconnected between the primary and secondary drivelines which is equipped with a dog-type mode clutch that can be selectively engaged for rigidly coupling the secondary driveline to the primary driveline to establish a part-time four-wheel drive mode. In contrast, the mode clutch is disengaged, drive torque is only delivered to the primary driveline for establishing a two-wheel drive mode.

A modern trend in four-wheel drive motor vehicles is to equip the transfer case with an electronically-controlled transfer clutch in place of the mode clutch. The transfer clutch is operable for automatically directing drive torque to the secondary wheels, without any input or action on the part of the vehicle operator, when traction is lost at the primary wheels for establishing an on-demand four-wheel drive mode. Typically, the transfer clutch includes a multiplate clutch assembly that is installed between the primary and secondary output shafts of the transfer case and which is actuated by a power-operated actuator in response to control signals sent from a controller. The control signals are typically based on current operating characteristics of the vehicle (i.e., vehicle speed, interaxle speed difference, acceleration, steering angle, etc.) as detected by various sensors. Thus, such "on-demand" transfer cases can utilize adaptive control schemes for automatically controlling torque distribution during all types of driving and road conditions.

In many instances, the vehicle operator is also permitted to select between the two-wheel drive mode and the part-time four-wheel drive mode in addition to the on-demand four-wheel drive mode. Specifically, when the two-wheel drive mode is selected, the clutch assembly is released for delivering all drive torque to the primary output shaft. In contrast, when the part-time four-wheel drive mode is selected, the clutch assembly is fully engaged for effectively locking the secondary output shaft to the primary output shaft. In such applications, a mode signal is sent to the controller which is indicative of the particular drive mode selected by the vehicle operator. Typically, the mode signal is generated by a mode selector device which is manipulated by the vehicle operator.

Currently, a large number of on-demand transfer cases are equipped with an electrically-controlled clutch actuator that can regulate the amount of drive torque transferred to the secondary output shaft as a function of the value of an electrical control signal applied thereto. In some applications, the transfer clutch employs an electromagnetic clutch as the power-operated actuator. For example, U.S. Pat. No. 5,407,024 discloses a electromagnetic coil that is incrementally activated to control movement of a ball-ramp operator for applying a clutch engagement force on a multi-plate clutch assembly. Likewise, Japanese Laid-open Patent Application No. 62-18117 discloses a transfer clutch equipped with an electromagnetic actuator for directly controlling actuation of the multi-plate clutch pack assembly.

As an alternative, the transfer clutch can employ an electric motor and a drive assembly as the power-operated clutch actuator. For example, U.S. Pat. No. 5,323,871 discloses an on-demand transfer case having a transfer clutch equipped with an electric motor that controls rotation of a sector plate which, in turn, controls pivotal movement of a lever arm that is operable for applying a variable clutch engagement force on a multi-plate clutch assembly. Moreover, Japanese Laid-open Patent Application No. 63-66927 discloses a transfer clutch which uses an electric motor to rotate one cam plate of a ball-ramp operator for engaging a multi-plate clutch assembly. Finally, U.S. Pat. No. 4,895,236 discloses a transfer case equipped with a transfer clutch having an electric motor driving a reduction gearset for controlling movement of a ball screw operator which, in turn, applies the clutch engagement force to the clutch pack.

While many on-demand clutch control systems similar to those described above are currently used in four-wheel drive vehicles, a need exists to advance the technology and address recognized system limitations. For example, the size, weight and electrical power requirements of the electromagnetic coil or the electric motors needed to provide the described clutch engagement loads may make such system cost prohibitive in some four-wheel drive vehicle applications. In an effort to address these concerns, new technologies are being considered for use in power-operated clutch actuator applications such as, for example, magnetorheological clutch actuators. One example of such an arrangement is described in U.S. Pat. No. 5,915,513 wherein a magnetorheological actuator controls operation of a ball-ramp unit to engage the clutch pack. While such an arrangement may appear to advance the art, its complexity clearly illustrates the need to continue development of even further defined advancement.

SUMMARY OF THE INVENTION

Thus, its is an object of the present invention to provide a transfer clutch having a magnetorheological clutch actuator that is operable for controlling movement of a thrust-generating clutch operator used to engage a multi-plate clutch assembly.

It is a further object of the present invention to provide a double-acting self-centering ball screw clutch operator in conjunction with a magnetorheological clutch actuator for use in a transfer clutch.

As a related object, the transfer clutch of the present invention is well-suited for use in motor vehicle driveline applications to control the transfer of drive torque between an input member and an output member.

According to a preferred embodiment, the transfer clutch includes a magnetorheological actuator which controls operation of a ball screw operator for controlling the magnitude of clutch engagement force exerted on a multi-plate clutch assembly that is operably disposed between an input member and an output member. The magnetorheological actuator includes an electromagnetic coil, and a rotor having a first segment retained in a sealed chamber filled with magnetorheological fluid. The ball screw operator includes a threaded screw mounted on the output member and which is splined to a second segment of the rotor, a threaded nut, and a plurality of balls retained between the aligned threads of the screw and nut. In addition, a drag spring provides a predetermined drag force between the screw and the output member. The multi-plate clutch assembly includes a drum driven by the input member, a hub driving the output member, and a clutch pack operably disposed between the drum and hub. The clutch assembly also includes a first pressure plate adapted to act on one end of the clutch pack and which couples the nut for rotation with the hub, a second pressure plate adapted to act on the other end of the clutch pack and which is driven by the drum, and a return spring acting between the first and second pressure plates. A housing is driven by the drum and defines the fluid chamber within which the first segment of the rotor is retained.

In operation, activation of the electromagnetic coil creates a magnetic flux field which travels through the housing and into the magnetorheological fluid for changing its viscosity and creating drag between the housing and the rotor, thereby causing relative rotation between the screw and nut of the ball screw operator. As such, relative rotation in a first direction causes axial movement of the threaded nut in a first direction which, in turn, causes the first pressure plate to exert a clutch engagement force on the clutch pack. Likewise, relative rotation between the screw and nut in the opposite direction causes axial movement of the nut in a second direction which, in turn, causes the second pressure plate to engage the clutch pack. Upon deactivation of the coil, the return spring forcibly separates the pressure plates to release the clutch pack and also acts to automatically center the nut relative to the screw.

BRIEF DESCRIPTION OF THE DRAWINGS

Further objects, features and advantages of the present invention will become apparent to those skilled in the art from analysis of the following written description, the appended claims, and accompanying drawings in which:

DETAILED DESCRIPTION OF THE PREFERRED EMBODIMENTS

The present invention is generally directed to a torque transfer mechanism that can be adaptively controlled for varying the torque transferred from an input member to at least one output member. The torque transfer mechanism finds particular application in motor vehicle drivelines as, for example, an on-demand clutch in a transfer case or in-line torque coupling, a biasing clutch associated with a differential assembly in a transfer case or a drive axle assembly, or as a shift clutch in power transmission assemblies. Thus, while the present invention is hereinafter described in association with a particular construction for use in particular driveline applications, it will be understood that the construction/application shown and described is merely intended to illustrate possible embodiments of the present invention.

Figure 1:
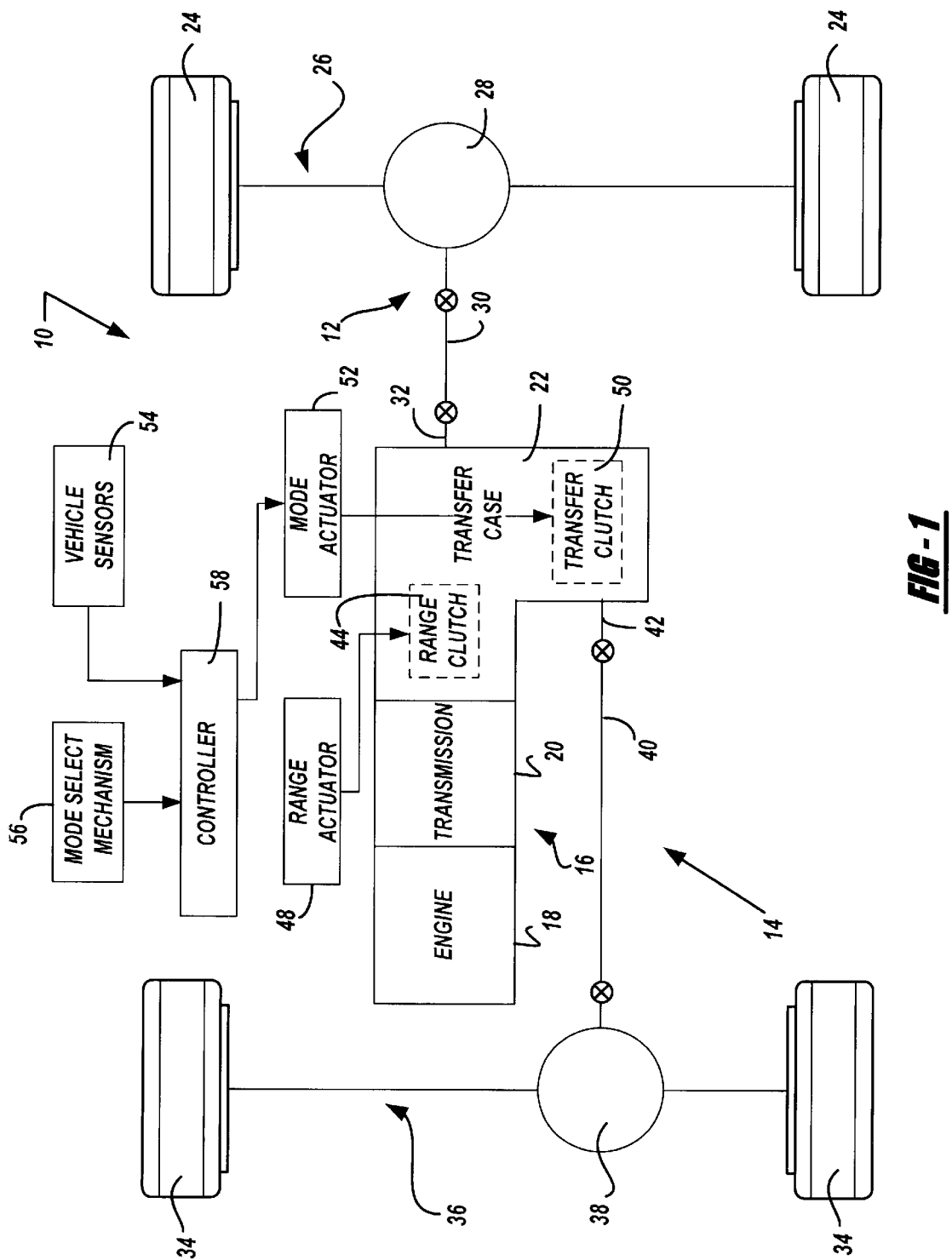
FIG. 1 illustrates the drivetrain of a four-wheel drive vehicle equipped with a power transmission device incorporating the present invention.

With particular reference to FIG. 1 of the drawings, a drivetrain 10 for a four-wheel drive vehicle is shown. Drivetrain 10 includes a primary driveline 12, a secondary driveline 14, and a powertrain 16 for delivering rotary tractive power (i.e., drive torque) to the drivelines. In the particular arrangement shown, primary driveline 12 is the rear driveline while secondary driveline 14 is the front driveline. Powertrain 16 includes an engine 18, a multi-speed transmission 20, and a power transmission device hereinafter referred to as transfer case 22. Rear driveline 12 includes a pair of rear wheels 24 connected at opposite ends of a rear axle assembly 26 having a rear differential 28 coupled to one end of a rear prop shaft 30, the opposite end of which is coupled to a rear output shaft 32 of transfer case 22. Front driveline 14 includes a pair of front wheels 34 connected at opposite ends of a front axle assembly 36 having a front differential 38 coupled to one end of a front prop shaft 40, the opposite end of which is coupled to a front prop shaft 42 of transfer case 22.

With continued reference to FIG. 1, drivetrain 10 is shown to further include an electronically-controlled power transfer system for permitting a vehicle operator to select between a two-wheel drive mode, a part-time four-wheel high-range drive mode, an on-demand four-wheel high-range drive mode, a neutral non-driven mode, and a part-time four-wheel low-range drive mode. In this regard, transfer case 22 is equipped with a range clutch 44 that is operable for establishing the high-range and low-range drive connections between an input shaft 46 and rear output shaft 32, and a power-operated range actuator 48 operable to actuate range clutch 44. Transfer case 22 also includes a transfer clutch 50 that is operable for transferring drive torque from rear output shaft 32 to front output shaft 42 for establishing the part-time and on-demand four-wheel drive modes. The power transfer system further includes a power-operated mode actuator 52 for actuating transfer clutch 50, vehicle sensors 54 for detecting certain dynamic and operational characteristics of the motor vehicle, a mode select mechanism 56 for permitting the vehicle operator to select one of the available drive modes, and a controller 58 for controlling actuation of range actuator 48 and mode actuator 52 in response to input signals from vehicle sensors 54 and mode selector 56.

Figure 2:
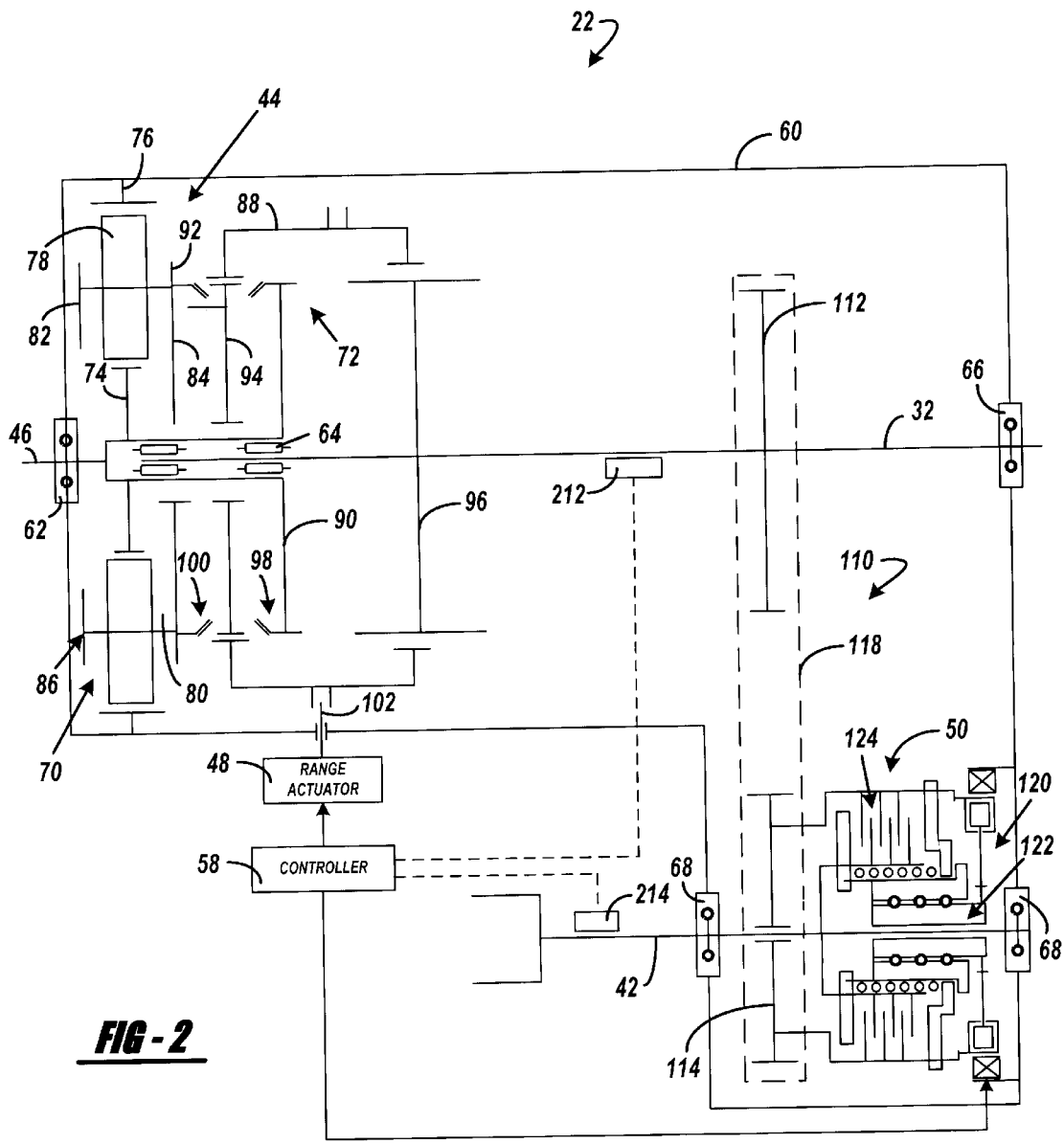
FIG. 2 is a schematic illustration of a transfer case equipped with the torque transfer mechanism of the present invention.

Transfer case 22 is shown schematically in FIG. 2 to include a housing 60 from which input shaft 46 is rotatably supported by bearing assembly 62. Input shaft 46 is adapted for connection to the output shaft of transmission 20. Rear output shaft 32 is also shown rotatably supported between input shaft 46 and housing 60 via bearing assemblies 64 and 66 while front output shaft 42 is rotatably supported from housing 60 by a pair of laterally-spaced bearing assemblies 68. Range clutch 44 is shown to include a planetary gearset 70 and a synchronized range shift mechanism 72. Planetary gearset 70 includes a sun gear 74 fixed for rotation with input shaft 46, a ring gear 76 fixed to housing 60, and a set of planet gears 78 rotatably supported on pinion shafts 80 extending between front and rear carrier rings 82 and 84, respectively, that are interconnected to define a carrier 86. Planetary gearset 70 functions as a two-speed reduction unit which, in conjunction with a sliding range sleeve 88 of synchronized range shift mechanism 72, is operable to establish either of a first or second drive connection between input shaft 46 and rear output shaft 32. To establish the first drive connection, input shaft 46 is directly coupled to rear output shaft 32 for defining a high-range drive mode in which rear output shaft 32 is driven at a first (i.e., direct) speed ratio relative to input shaft 46. Likewise, the second drive connection is established by coupling carrier 86 to rear output shaft 32 for defining a low-range drive mode in which rear output shaft 32 is driven at a second (i.e., reduced) speed ratio relative to input shaft 46. A neutral non-driven mode is established when rear output shaft 32 is disconnected from both input shaft 46 and carrier 86.

Synchronized range shift mechanism 72 includes a first clutch plate 90 fixed for rotation with input shaft 46, a second clutch plate 92 fixed for rotation with rear carrier ring 84, a clutch hub 94 rotatably supported on input shaft 46 between clutch plates 90 and 92, and a drive plate 96 fixed for rotation with rear output shaft 32. Range sleeve 88 has a first set of internal spline teeth that are shown meshed with external spline teeth on clutch hub 94, and a second set of internal spline teeth that are shown meshed with external spline teeth on drive plate 96. As will be detailed, range sleeve 88 is axially moveable between three distinct positions to establish the high-range, low-range and neutral modes. Range shift mechanism 72 also includes a first synchronizer assembly 98 located between hub 94 and first clutch plate 90 and a second synchronizer assembly 100 is disposed between hub 94 and second clutch plate 92. Synchronizers 98 and 102 work in conjunction with range sleeve 88 to permit on-the-move range shifts.

With range sleeve 88 located in its neutral position, as denoted by position line "N", its first set of spline teeth are disengaged from the external clutch teeth on first clutch plate 90 and from the external clutch teeth on second clutch plate 92. First synchronizer assembly 98 is operable for causing speed synchronization between input shaft 46 and rear output shaft 32 in response to sliding movement of range sleeve 88 from its N position toward a high-range position, denoted by position line "H". Upon completion of speed synchronization, the first set of spline teeth on range sleeve 88 move into meshed engagement with the external clutch teeth on first clutch plate 90 while its second set of spline teeth are maintained in engagement with the spline teeth on drive plate 96. Thus, movement of range sleeve 88 to its H position acts to couple rear output shaft 32 for common rotation with input shaft 46 and establishes the high-range drive connection therebetween. Similarly, second synchronizer assembly 100 is operable for causing speed synchronization between carrier 86 and rear output shaft 32 in response to sliding movement of range sleeve 88 from its N position to a low-range position, as denoted by position line "L". Upon completion of speed synchronization, the first set of spline teeth on range sleeve 88 move into meshed engagement with the external clutch teeth on second clutch plate 92 while the second set of spline teeth on range sleeve 88 are maintained in engagement with the external spline teeth on drive plate 96. Thus with range sleeve 88 located in its L position, rear output shaft 32 is coupled for rotation with carrier 86 and establishes the low-range drive connection between input shaft 46 and rear output shaft 32.

To provide means for moving range sleeve 88 between its three distinct range position, range shift mechanism 72 further includes a range fork 102 coupled to range sleeve 88 and which is mounted on a shift rail (not shown) for axial movement thereon. Range actuator 48 is operable to move range fork 102 on the shift rail for causing corresponding axial movement of range sleeve 88 between its three range positions. Range actuator 48 is preferably an electric motor arranged to move range sleeve 88 to a specific range position in response to a control signal from controller 58 that is based on the mode signal delivered to controller 58 from mode select mechanism 56.

It will be appreciated that the synchronized range shift mechanism permits "on-the-move" range shifts without the need to stop the vehicle which is considered to be a desirable feature. However, other synchronized and non-synchronized versions of range clutch 44 can be used in substitution for the particular arrangement shown. Also, it is contemplated that range clutch 44 can be removed entirely from transfer case 22 such that input shaft 46 would directly drive rear output shaft 32 to define a one-speed version of the on-demand transfer case embodying the present invention.

Figure 3:
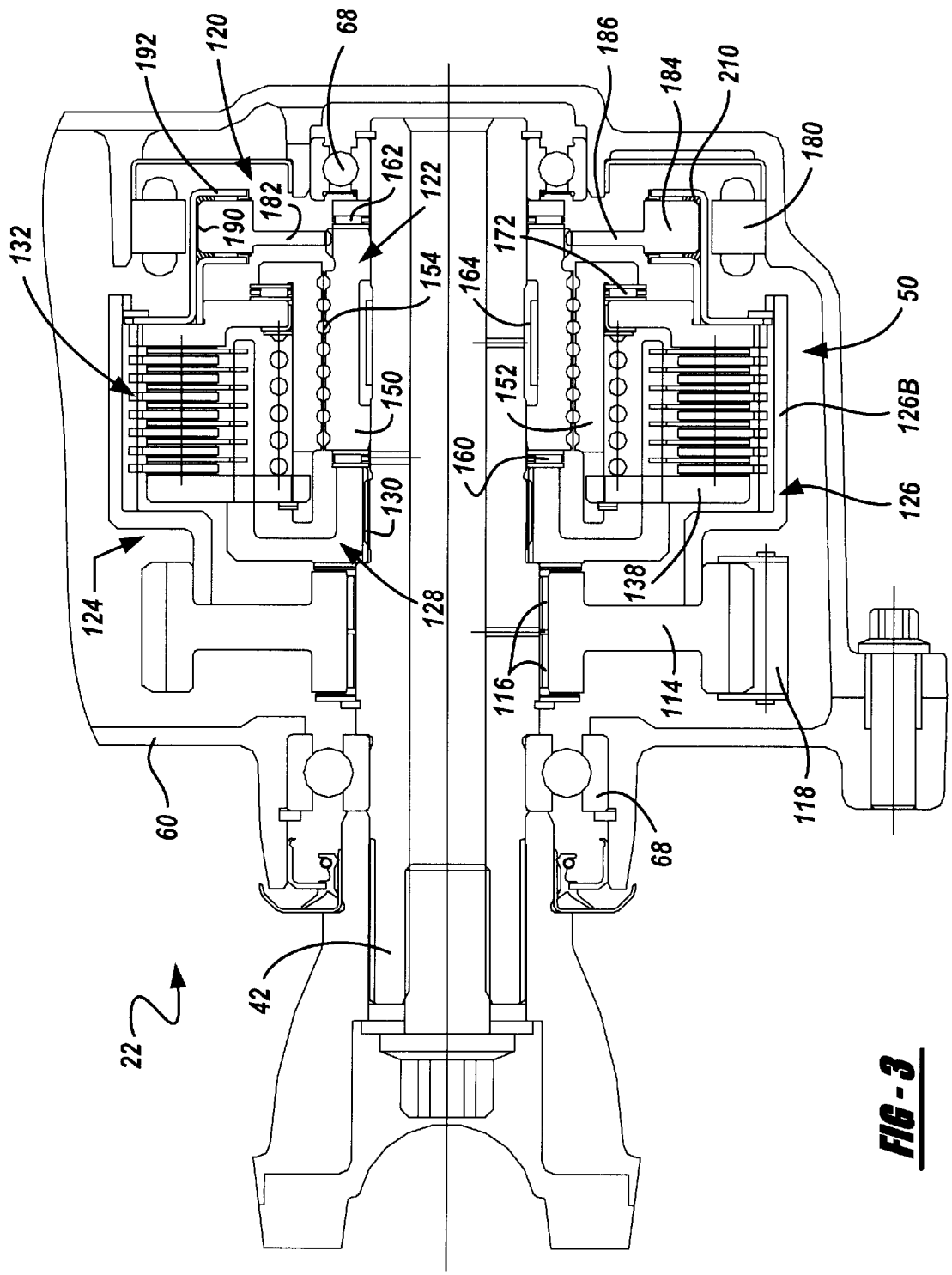
FIG. 3 is a partial sectional view of the torque transfer mechanism arranged for selectively transferring drive torque from the primary output shaft to the secondary output shaft.
Figure 4:
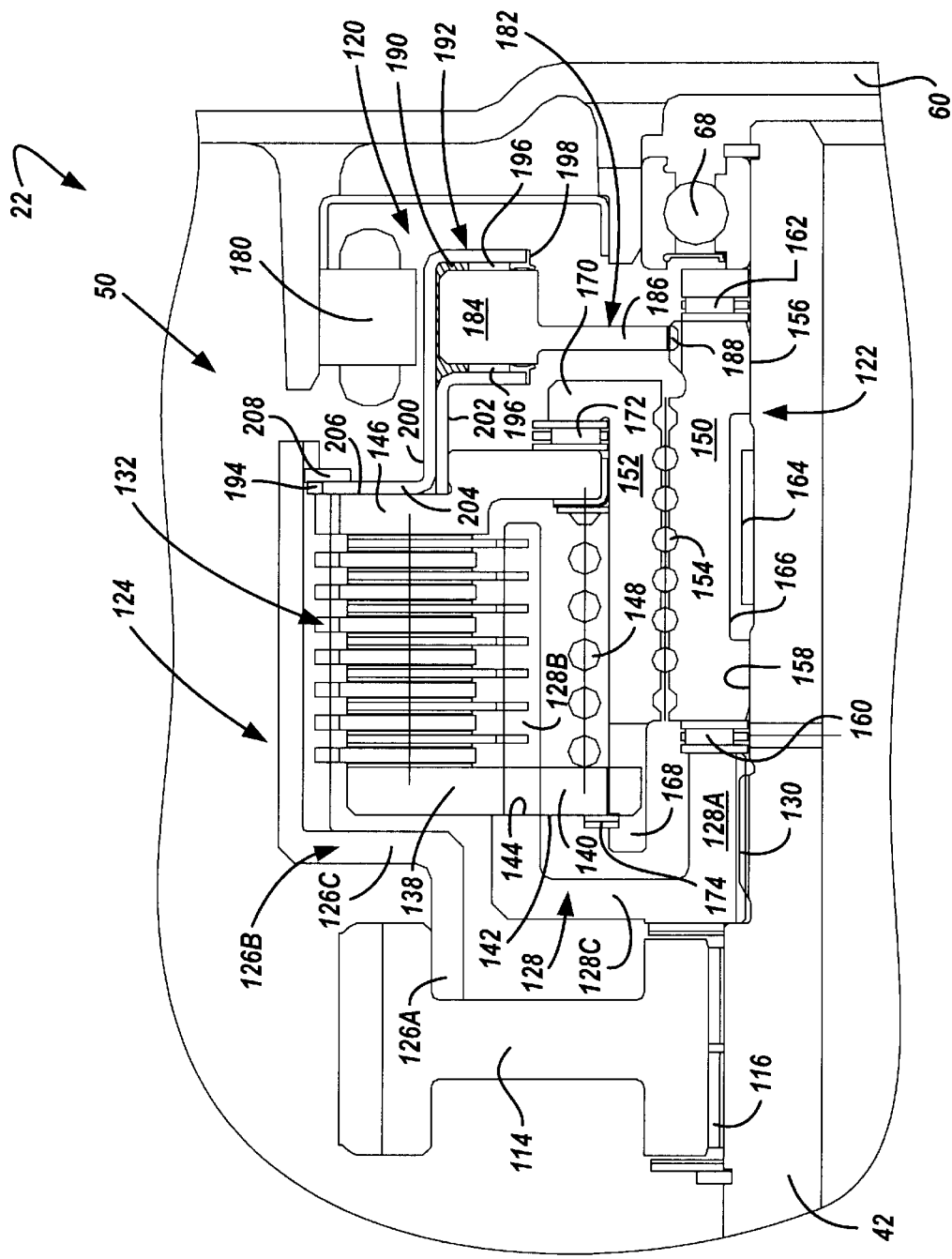
FIG. 4 is an enlarged partial section view taken from FIG. 3 showing the components of the torque transfer mechanism in greater detail.

Referring now primarily to FIGS. 3 and 4 of the drawings, transfer clutch 50 is shown arranged in association with front output shaft 42 in such a way that it functions to deliver drive torque from a transfer assembly 110 driven by rear output shaft 32 to front output shaft 42 for establishing the four-wheel drive modes. Transfer assembly 110 includes a first sprocket 112 fixed for rotation with rear output shaft 32, a second sprocket 114 rotatably supported by bearings 116 on front output shaft 42, and a power chain 118 encircling sprockets 112 and 114. As will be detailed, mode actuator 52 is a magnetorheological clutch actuator 120 while transfer clutch 50 includes a ball screw clutch operator 122 and a multi-plate clutch assembly 124. The combination of transfer clutch 50 and mode actuator 52 defines the torque transfer mechanism of the present invention.

Clutch assembly 124 is shown to include an annular drum 126 fixed for rotation with second sprocket 114, a hub 128 fixed via a splined connection 130 for rotation with front output shaft 42, and a multi-plate clutch pack 132 operably disposed between drum 126 and hub 128. In particular, drum 126 has a first smaller diameter cylindrical rim 126A that is welded to sprocket 114 and a second larger diameter cylindrical rim 126B that is interconnected to rim 126A by a radial plate segment 126C. Hub 128 is shown to include a first smaller diameter hub segment 128A and a second larger diameter hub segment 128B that are interconnected by a radial plate segment 128C. Clutch pack 132 includes a set of outer friction plates 134 splined to outer rim 126B of drum 126 and which are alternatively interleaved with a set of inner friction plates 136 splined to hub segment 128B of clutch hub 128. Clutch assembly 124 further includes a first pressure plate 138 having a plurality of circumferentially-spaced and radially-extending tangs 140 that are slid into longitudinally-extending slots formed in hub segment 128B prior to installation of clutch pack 132 such that a front face surface 142 of tangs 140 abut an end surface 144 of the slots so as to define a fully retracted position of first pressure plate 138 relative to clutch pack 132. Thus, first pressure plate 138 is coupled for rotation with clutch hub 128 and front output shaft 42. A second pressure plate 146 is splined to rim 126B of drum 128 for rotation therewith. As seen, a return spring 148 acts between pressure plates 138 and 146.

With continued reference to FIGS. 3 and 4, ball screw operator 122 of transfer clutch 50 is shown to include an externally threaded screw 150, an internally threaded nut 152, and rollers 154 disposed in aligned threads between screw 150 and nut 152. Screw 150 has an inner surface 156 that is journalled on an outer surface 158 of front output shaft 142. A pair of thrust bearing assemblies 160 and 162 are shown on opposite sides of screw 150 so as to facilitate rotation thereof relative to hub 128 and bearing assembly 68. A drag spring 164 is nested in an annular chamber 166 formed in screw 150 and functions to resiliently interconnect screw 150 for rotation with front output shaft 42 until an external reaction force acting on screw 150 exceeds the predetermined drag force exerted on front output shaft 42 by drag spring 164. Nut 152 is shown to include axially-extending lugs 168 which are interdigitated with the terminal end of tangs 140 such that nut 152 is adapted to rotate with clutch hub 128 and front output shaft 42. Nut 152 also includes a radially-extending rim defining an apply plate 170 that is adapted to act on second pressure plate 144. Apply plate 170 and second pressure plate 144 are separated by a thrust bearing assembly 172 which permits relative rotation therebetween. A snap ring 174 is provided to axially restrain the terminal end of tangs 140 on lugs 168 of nut 152 and is located to cooperate with end surface 144 of hub 128 to prevent forward movement of first pressure plate 138 beyond its fully retracted position.

Magnetorheological clutch actuator 120 generally includes an electromagnetic coil 180 that is rigidly mounted to housing 60, and a rotor 182. Rotor 182 has a cylindrical outer rim 184 extending from a central disk segment 186 which is shown to be fixed via a splined connection 188 to screw 150 of ball screw operator 122. Thus, rotor 182 is coupled for rotation with screw 150. Outer ring 184 of rotor 182 is disposed in an annular chamber 190 defined by a casing 192 that is fixed via a splined connection 194 for rotation with drum 126. A pair of washer rings 196 are provided to centrally locate rim 184 of rotor 182 within chamber 190. In addition, seal ring 198 provides a fluid-tight seal between rim 184 of rotor 182 and casing 192 and which permit relative rotation therebetween. Casing 192 is preferably made from a low carbon iron material and includes a first case segment 200 that is welded to a second case segment 202 so as to define chamber 190. First case segment 200 is shown to include a radial flange 204 juxtapositioned adjacent to an outer surface 206 of second pressure plate 146 and which is axially restrained by a snap ring 208 mounted to drum rim 126B. Return spring 148 is arranged to urge outer surface 206 of second pressure plate 144 into contact with flange 204 of first case segment 200 so as to define the fully retracted position of second pressure plate 146 relative to clutch pack 132.

Chamber 190 is filled with a magnetorheological (MR) fluid 210, preferably of a high viscosity, and of the type manufactured by the Lord Corporation, Erie, Pa. As is known, when MR fluid 210 is exposed to a magnetic field, the magnetic particles therein will align with the field and increase the viscosity and, therefore, the shear strength of MR fluid 210. Increased shear strength results in greater resistance to relative motion between casing 192 and rotor 182, thereby acting to transfer torque to rotor 182 and ultimately to screw 150. As will be understood, when the electric current sent to coil 180 exceeds a predetermined minimum value, the magnetic field passing through MR fluid 210 causes a viscosity change sufficient to increase the shear force acting on rotor 180 to overcome the drag force exerted by drag spring 164 on screw 150. As such, screw 150 will rotate relative to nut 152 which causes nut 152 to advance for generating a corresponding clutch engagement force that is applied to clutch pack 132. The torque transfer characteristics of MR fluid 210 vary with the intensity of the magnetic field and, thus, with the magnitude of the electric control signal sent to coil 180. As such, the value of the clutch engagement force generated by ball screw operator 122 and applied to clutch pack 132 of clutch assembly 124 can be adaptively varied as a function of the magnitude of the electric control signal sent to coil 180 between a no torque transfer condition (two-wheel drive mode with 100% of drive torque to rear output shaft 32) and a torque-split condition (part-time four-wheel drive mode with 50% of drive torque to front output shaft 42 and 50% to rear output shaft 32).

In operation, when mode selector 56 indicates selection of the two-wheel high-range drive mode, range actuator 48 is signaled to move range sleeve 88 to its H position and transfer clutch 50 is maintained in a released condition with no electric signal sent to coil 180 of magnetorheological clutch actuator 122, whereby all drive torque is delivered to rear output shaft 32. If mode selector 56 thereafter indicates selection of a part-time four-wheel high-range mode, range sleeve 86 is maintained in its H position and a predetermined maximum electrical control signal is sent by controller 58 to coil 180 of magnetorheological actuator 122 which causes rotor 182 to be effectively coupled for rotation with casing 192 due to the resultant change in viscosity of MR fluid 210. Such action causes relative rotation between screw 150 and nut 152 which, as noted, causes axial movement of nut 152 for engaging clutch pack 132.

If the relative rotation between screw 150 and nut 152 is in a first direction, nut 152 is advanced on screw 150 in a first axial (i.e., forward) direction such that apply plate 170 moves second pressure plate 146 axially from its fully retracted position until a maximum clutch engagement force is executed on clutch pack 132 for effectively coupling hub 128 to drum 126. In response to such movement of second pressure plate 146, return spring 148 is compressed and acts to forcibly locate first pressure plate 138 in its fully retracted position against snap ring 174 where it acts as a reaction member against which clutch pack 132 is compressed. In contrast, if the relative rotation is in a second direction, nut 152 is advanced on screw 150 in a second axial (i.e., rearward) direction such that snap ring 174 urges first pressure plate 138 to move from its fully retracted position until a maximum clutch engagement force is exerted on clutch pack 132 for coupling hub 128 to drum 126. Again, return spring 148 is compressed and acts to locate second pressure plate 146 in its fully retracted position where it acts as a reaction member against which clutch pack 132 is compressed. Under either scenario, clutch pack 132 is fully compressed such that drive torque delivered to transfer assembly 110 from rear output shaft 32 is transferred to front output shaft 42.

If a part-time four-wheel low-range drive mode is selected, the operation of transfer clutch 50 and magnetorheological clutch actuator 122 are identical to that described above for the part-time high-range drive mode. However, range actuator 48 is signaled to locate range sleeve 88 in its L position to establish the low-range drive connection between input shaft 46 and rear output shaft 32.

When the mode signal indicates selection of the on-demand four-wheel high-range drive mode, range actuator 48 moves or maintains range sleeve 88 in its H position and magnetorheological clutch actuator 122 is placed in a ready or "stand-by" condition. Specifically, the minimum amount of drive torque sent to front output shaft 42 through transfer clutch 50 in the stand-by condition can be zero or a slight amount (i.e., in the range of 2–10%) as required for the certain vehicular application. This minimum stand-by torque transfer is generated by controller 58 sending a control signal having a predetermined minimum value to coil 180. Thereafter, controller 58 determines when and how much drive torque needs to be transferred to front output shaft 42 based on tractive conditions and/or vehicle operating characteristics detected by vehicle sensors 54. For example, a first speed sensor 212 sends a signal to controller 58 indicative of the rotary speed of rear output shaft 32 while second speed sensor 214 sends a signal indicative of the rotary speed of front output shaft 42. Controller 58 can vary the value of the electric control signal sent to coil 180 between the predetermined minimum value and the predetermined maximum value based on defined relationships such as, for example, the speed difference ΔRPM between output shafts 32 and 42.

Providing an electric control signal to coil 180 having a value between the predefined minimum and maximum values generates a magnetic field having a corresponding intensity and which is directed through casing 192 to MR fluid 210 for varying the fluid viscosity and the frictional drag between casing 192 and rotor 182. When drum 126 is rotating at a different speed than hub 128, this drag causes torque to be transferred through rotor 182 to screw 150, thereby causing relative rotation between screw 150 and nut 152. This relative rotation acts to advance nut 152 for applying a corresponding clutch engagement force on clutch pack 132.

A specific feature of ball screw operator 122 is that it is not self-engaging but rather capable of progressive or adaptive operation for generating corresponding torque transfer in response to a variable electric control signal. Moreover, ball screw operator 122 is self-centering with return spring 148 providing a restoring force which functions to automatically center nut 152 relative to screw 150 when coil 180 is de-energized. The use of a low torque MR clutch actuator 220 in conjunction with double-acting ball screw operator 122 permits use of transfer clutch 50 in high torque driveline applications yet provides superior response times compared to conventional electromagnetic or electric motor type torque transfer systems. Anticipated response times in the range of 10–50 ms for MR fluid 210 and minimum coil requirements of less than three amps of current for full torque capacity are considered to provide significant advantages over conventional systems.

While transfer clutch 50 is shown arranged on front output shaft 42, it is evident that it could easily be installed on rear output shaft 32 for transferring drive torque to a transfer assembly arranged to drive front output shaft 42. Likewise, the present invention can be used as an in-line torque transfer coupling in an all wheel drive vehicle to selectively and/or automatically transfer drive torque on-demand from the primary (i.e., front) driveline to the secondary (i.e., rear) driveline. Likewise, in full-time transfer cases equipped with an interaxle differential, transfer clutch 50 could be used to limit slip and bias torque across the differential.

Figure 5:
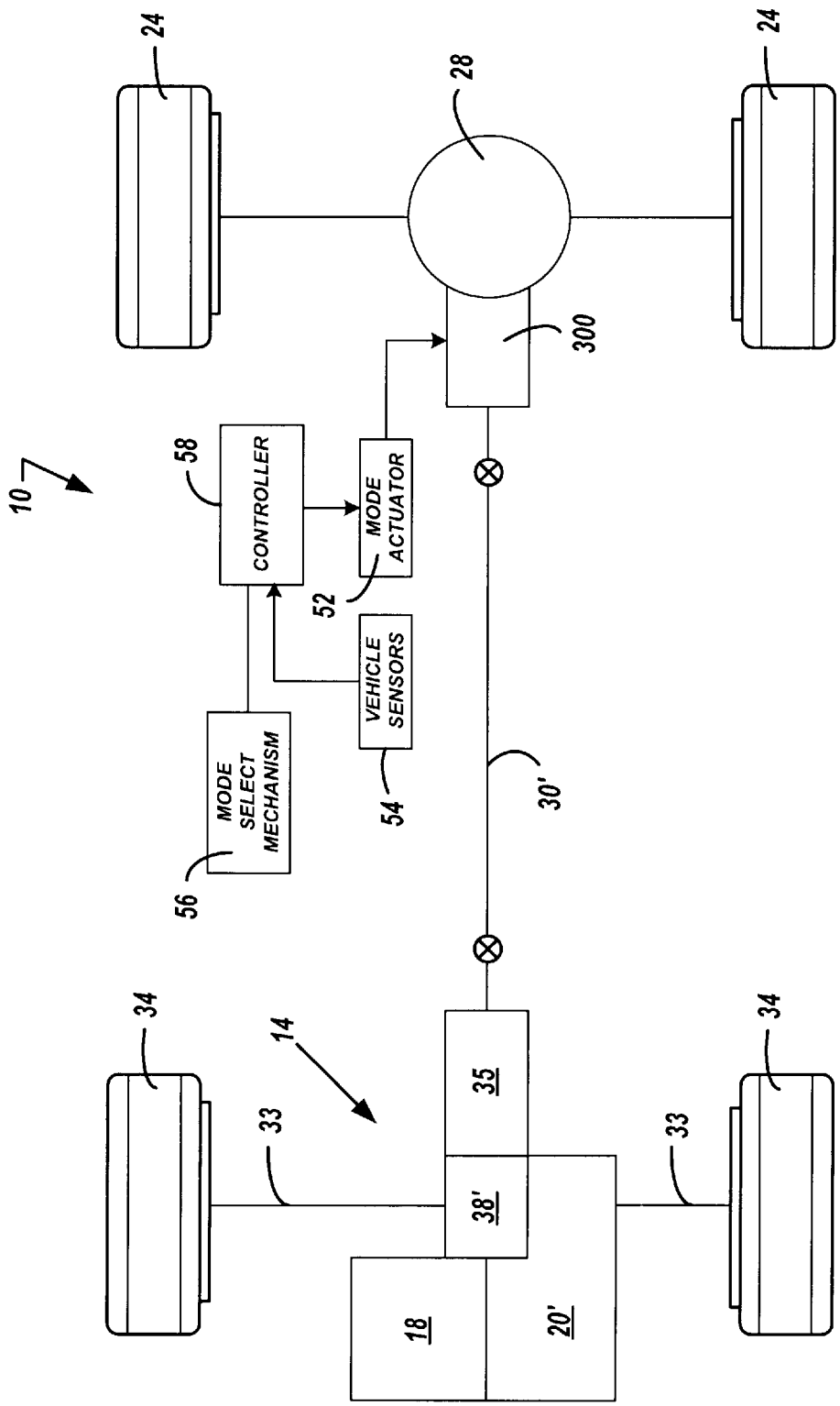
FIG. 5 is a schematic illustration of an alternative drivetrain for a four-wheel drive vehicle equipped with a power transmission device of the present invention.

To illustrate an alternative power transmission device to which the present invention is applicable, FIG. 5 schematically depicts a front-wheel based four-wheel drive layout. In particular, engine 18 drives a multi-speed transmission 20' having an integrated front differential unit 38' for driving front wheels 34 via axle shafts 33. A transfer unit 35 is also driven by transmission 20' for delivering drive torque to the input member of a torque transfer coupling 300 via a drive shaft 30'. In particular, the input member of transfer coupling 300 is coupled to drive shaft 30' while its output member is coupled to a drive component of rear differential 28. Accordingly, when sensors indicate the occurrence of a front wheel slip condition, controller 58 adaptively controls actuation of torque coupling 300 such that drive torque is delivered "on-demand" to rear wheels 24. It is contemplated that torque transfer coupling 300 would include a multi-plate transfer clutch and a magnetorheological clutch actuator that are generally similar in structure and function to that of the arrangement previously described herein with respect to transfer case 22. While shown in association with rear differential 28, it is to be understood that torque coupling 300 could, in the alternative, be operably located for transferring drive torque from transfer unit 35 to drive shaft 30'.

Figure 6:
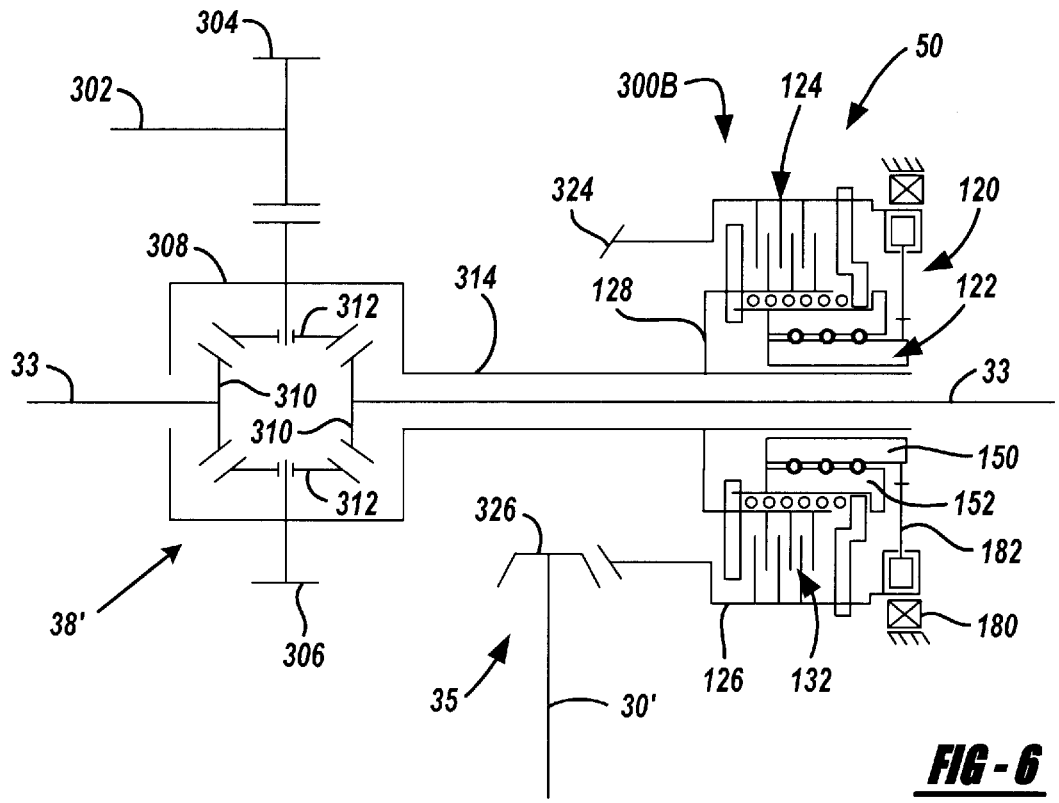
FIGS. 6 through 9 are schematic illustrations of alternative embodiments of power transmission devices according to the present invention.

Referring now to FIG. 6, torque coupling 300A is schematically illustrated in association with an on-demand four-wheel drive system that is based on a front-wheel drive vehicle similar to that shown in FIG. 5. In particular, an output shaft 302 of transaxle 20' is shown to drive an output gear 304 which, in turn, drives an input gear 306 fixed to a carrier 308 associated with front differential unit 38'. To provide drive torque to front wheels 34, front differential unit 38' includes a pair of side gears 310 that are connected to front wheels 34 via axleshafts 33. Differential unit 38' also includes pinions 312 that are rotatably supported on pinion shafts fixed to carrier 308 and which are meshed with side gears 310. A transfer shaft 314 is provided to transfer drive torque from carrier 308 to clutch hub 128 associated with multi-pate clutch assembly 124. As before, clutch assembly 124 also includes a drum 126 and a clutch pack 132 having interleaved clutch plates operably connected between hub 128 and drum 126.

Transfer unit 35 is a right-angled drive mechanism including a ring gear 324 fixed for rotation with drum 126 of clutch assembly 124 and which is meshed with a pinion gear 326 fixed for rotation with drive shaft 30'. As seen, magnetorheological clutch actuator 120 is schematically illustrated for controlling actuation of clutch assembly 124 via operation of ball screw operator 122. According to the present invention, magnetorheological actuator 120 is similar to the magnetorheological clutch actuator previously described in that an electromagnetic coil is supplied with electric current for changing the viscosity of a magnetorheological fluid which, in turn, functions to control translational movement of a rotary screw nut 152 for causing an adaptive clutch engagement force to be applied to clutch pack 132. In operation, drive torque is transferred from the primary (i.e., front) driveline to the secondary (i.e., rear) driveline in accordance with the particular mode selected by the vehicle operator via mode selector 56. For example, if the on-demand 4WD mode is selected, controller 58 controls variable actuation of magnetorheological clutch actuator 120 in response to the vehicle operating conditions detected by sensors 54 by varying the value of the electric control signal sent to electromagnetic coil 180. In this manner, the level of clutch engagement and the amount of drive torque that is transferred through clutch pack 132 to the rear driveline through transfer unit 35 and drive shaft 30' is adaptively controlled. In contrast, selection of the locked or part-time 4WD mode results in full engagement of transfer clutch 50 for rigidly coupling the front driveline to the rear driveline. In some applications, the mode selector 56 may be eliminated such that only the on-demand 4WD mode is available so as to continuously provide adaptive traction control between the drivelines without any input from the vehicle operator.

Figure 7:
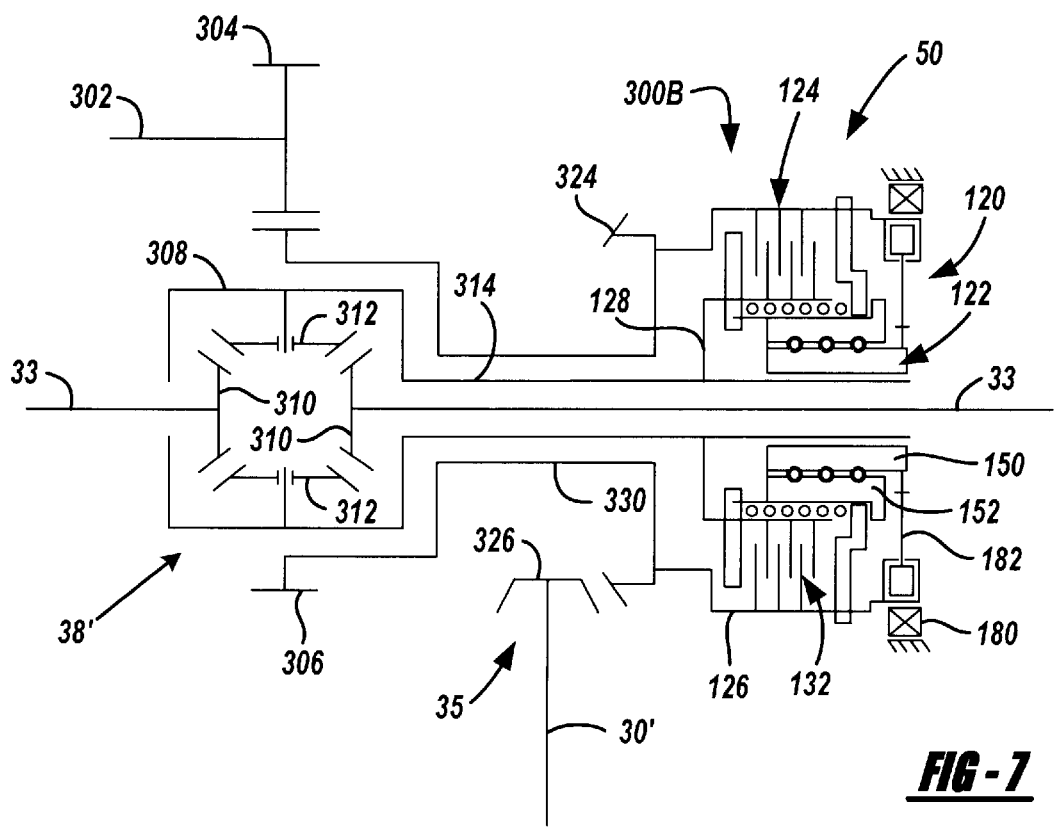

FIG. 7 illustrates a modified version of FIG. 6 wherein the on-demand four-wheel drive system is based on a rear-wheel drive motor vehicle that is arranged to normally deliver drive torque to rear wheels 24 while selectively transmitting drive torque to front wheels 34 through a torque coupling 300B. In this arrangement, drive torque is transmitted directly from transmission output shaft 302 to transfer unit 35 via a drive shaft 330 interconnecting input gear 306 to ring gear 324. To provide drive torque to front wheels 34, torque coupling 300B is now shown operably disposed between drive shaft 330 and transfer shaft 314. In particular, transfer clutch 50 is arranged such that drum 126 is driven with ring gear 324 by drive shaft 330. As such, actuation of torque coupling 300B functions to transfer torque from drum 126 through clutch pack 132 to hub 128 which, in turn, drives carrier 308 of front differential unit 38' via transfer shaft 314.

Figure 8:
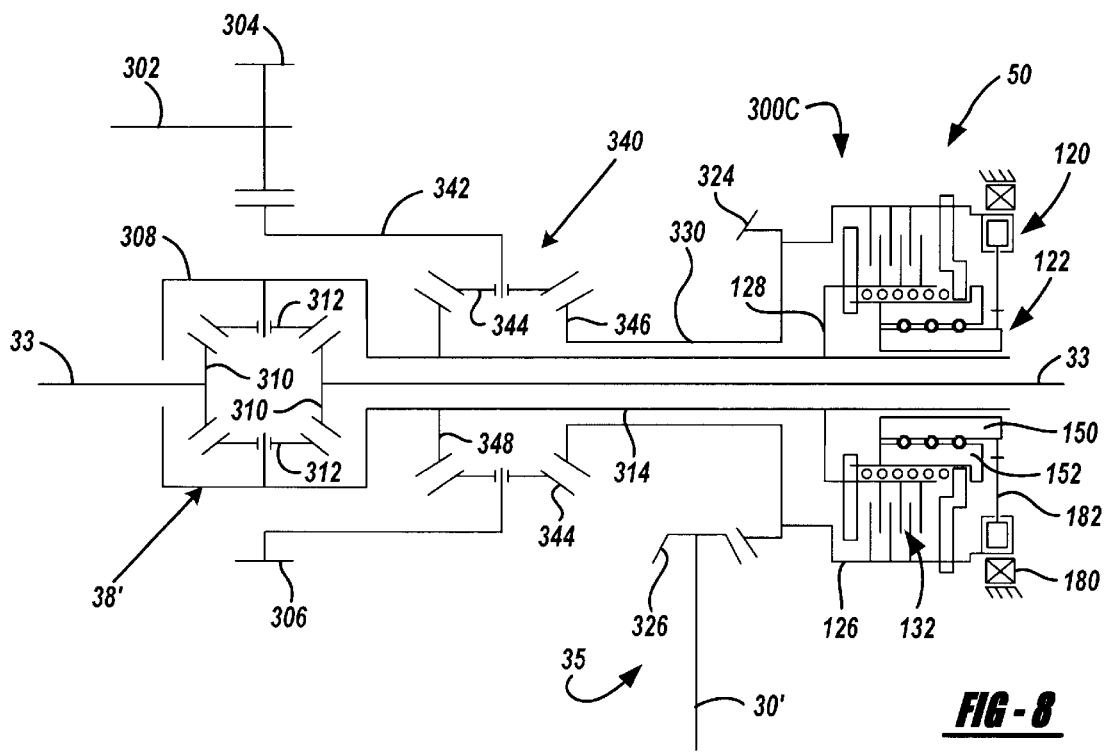

In addition to the on-demand 4WD systems shown previously, the torque transfer mechanism of the present invention can likewise be used in full-time 4WD systems to adaptively bias the torque distribution transmitted by a center or "interaxle" differential unit to the front and rear drivelines. For example, FIG. 8 schematically illustrates a full-time four-wheel drive system which is generally similar to the on-demand four-wheel drive systems shown in FIGS. 6 and 7 with the exception that an interaxle differential unit 340 is now operably installed between carrier 308 of front differential unit 38' and transfer shaft 314. In particular, output gear 306 is fixed for rotation with a carrier 342 of interaxle differential 340 from which pinion gears 344 are rotatably supported. A first side gear 346 is meshed with pinion gears 344 and is fixed for rotation with drive shaft 330 so as to be drivingly interconnected to the rear driveline through transfer unit 35. Likewise, a second side gear 348 is meshed with pinion gears 344 and is fixed for rotation with transfer shaft 314 and carrier 308 of front differential unit 38' so as to be drivingly interconnected to the front driveline. As seen, torque coupling 300C is operably disposed between transfer shaft 314 and drive shaft 330 for adaptively controlling torque biasing therebetween. In operation, when sensor 54 detects a vehicle operating condition, such as excessive interaxle slip, controller 58 adaptively controls activation of the electromagnetic coil associated with magnetorheological clutch actuator 120 for controlling engagement of transfer clutch 50 and thus the torque biasing between the front and rear driveline. If the vehicle is equipped with a mode selector 56, the vehicle operator will be able to select between an on-demand all-wheel drive (AWD) mode and the locked part-time 4WD mode. The on-demand AWD mode is similar to the on-demand 4WD mode except that torque biasing between the front and rear drivelines is now provided across interaxle differential 340.

Figure 9:
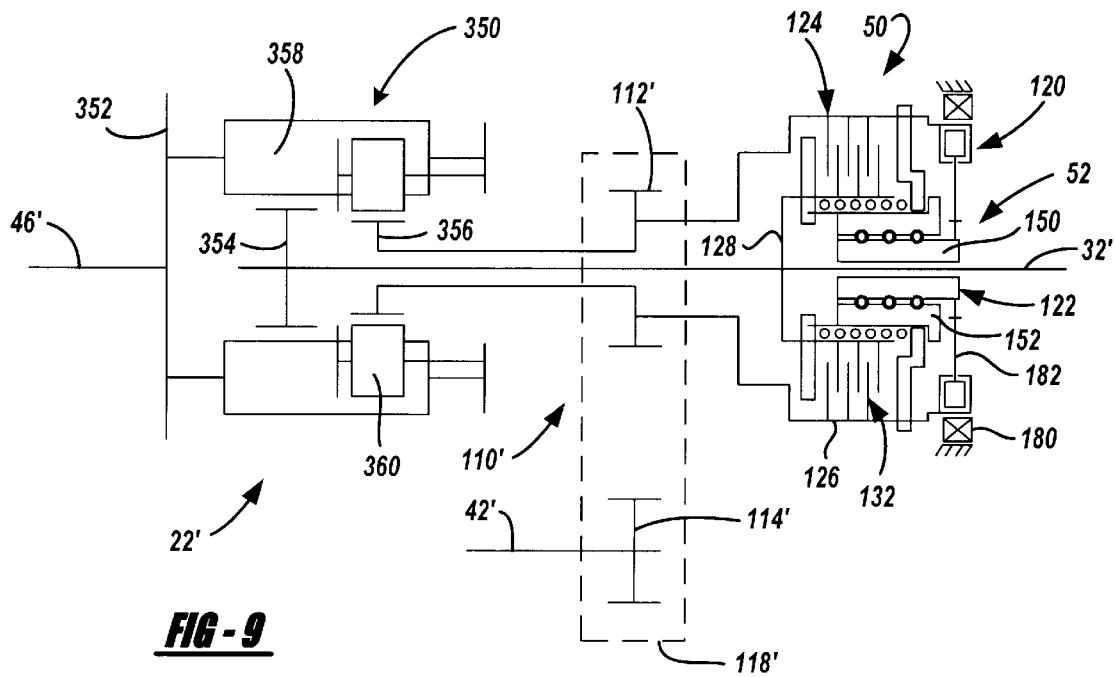

Referring now to FIG. 9, a full-time 4WD system is shown to include a transfer case 22' equipped with an interaxle differential 350 between an input shaft 46' and output shafts 32' and 42'. Differential 350 includes an input member driven by input shaft 46' and shown as a planet carrier 352, a first output member defined as a first sun gear 354, a second output member defined as a second sun gear 356, and a gearset for permitting speed differentiation between first and second sun gears 354 and 356. The gearset includes meshed pairs of first planet gears 358 and second pinions 360 which are rotatably supported by carrier 352. First planet gears 358 are shown to mesh with first sun gear 354 while second planet gears 350 are meshed with second sun gear 356. First sun gear 354 is fixed for rotation with rear output shaft 32' so as to transmit drive torque to rear driveline 12. To transmit drive torque to front driveline 14, second sun gear 356 is coupled to a transfer assembly 110' which includes a first sprocket 112' rotatably supported on rear output shaft 32', a second sprocket 114' fixed to front output shaft 42', and a power chain 118'.

Transfer case 22' further includes a transfer clutch 50 having a multi-plate clutch assembly 124 and a mode actuator 52 having a magnetorheological clutch actuator 120. Clutch assembly 124 includes a drum 126 fixed for rotation with first sprocket 112', a hub 128 fixed for rotation with rear output shaft 32', and a multi-plate clutch pack 132 operably disposed therebetween. Magnetorheological clutch actuator 120 includes an electromagnetic coil that can be energized for controlling the viscosity of the magnetorheological fluid for controlling movement of a screw nut 152 relative to clutch pack 132.

Preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A power transmission device comprising:
    an input member adapted to receive drive torque from a source of torque;
    an output member adapted to provide drive torque to an output device;
    a torque transfer mechanism operable for transferring drive torque from said input member to said output member; said torque transfer mechanism including: a friction clutch assembly operably disposed between said input member and said output member; a ball screw operator having a first screw member mounted on said output member and a second screw member supported for axial movement relative to said first screw member for generating a clutch engagement force to be applied to said friction clutch assembly; a resilient coupling mechanism for coupling said first screw member for rotation with said output member; and a magnetorheological actuator having a rotor with a first portion fixed for rotation with said first screw member and a second portion disposed in a chamber filled with a magnetorheological fluid, and a electromagnetic coil arranged to vary the viscosity of said fluid in said chamber in response to electric control signals; and
    a controller for generating said electric control signals.

2. The power transmission device of claim 1 wherein said ballscrew operator further includes balls retained between aligned threads formed in said first and second screw members.

3. The power transmission device of claim 1 wherein said resilient coupling mechanism provides a predetermined drag force between said first screw member and said output member for causing said first screw member to rotate with said output member until a force applied to said rotor upon activation of said coil causes said first screw member to rotate relative to said output member.

4. The power transmission device of claim 1 wherein said friction clutch assembly includes a first clutch member driven by said input member, a second clutch member driving said output member, a clutch pack operably interleaved between said first and second clutch members, an apply plate moveable relative to said clutch pack in response to movement of said second screw member, and a case member fixed for rotation with said first clutch member and having spaced segments defining said chamber within which said first portion of said rotor is disposed.

5. The power transmission device of claim 4 wherein said electromagnetic coil is fixed to a non-rotational housing and is located in proximity to said spaced segments of said case member, whereby activation of said coil creates a magnetic field which causes the viscosity of said magnetorheological fluid to increase for resisting relative rotation between said case member and said rotor.

6. The power transmission device of claim 4 wherein said friction clutch assembly further includes a return spring for biasing said apply plate to release said clutch pack.

7. The power transmission device of claim 1 wherein said input member is a first output shaft of a transfer case and said output member is a second output shaft of said transfer case.

8. The power transmission device of claim 1 wherein said input member is driven by a powertrain of a motor vehicle and said output member is connected to a differential of an axle assembly.

9. The power transmission device of claim 1 wherein said controller establishes the value of said electric control signal based on a rotary speed difference between said input member and said output member, and wherein said control signal is operable to vary the viscosity of said magnetorheological fluid in said chamber which results in axial movement of said second screw member relative to said friction clutch assembly.

10. A power transmission device for use in a motor vehicle having a source of drive torque and first and second drivelines, comprising:
   an input member adapted to receive drive torque from the torque source;
   a first output member adapted to transfer drive torque from said input member to the first driveline;
   a second output member adapted for connection to the second driveline;
   a torque transfer mechanism operable for transferring drive torque from said first output member to said second output member; said torque transfer mechanism including, a friction clutch assembly operably disposed between said first output member and said second output member, a ballscrew operator having a first screw member mounted on said second output member and a second screw member supported for axial movement relative to said first screw member for generating a clutch engagement force to be applied to said friction clutch assembly, a rotor having a first portion fixed for rotation with said first screw member and a second portion disposed in a chamber filled with a magnetorheological fluid, and a electromagnetic coil arranged to vary the viscosity of said magnetorheological fluid in response to electric control signals; and
   a controller for generating said electric control signals.

11. The power transmission device of claim 10 wherein said power transmission device is a transfer case having an input shaft as its input member, a first output shaft as its first output member, and a second output shaft as its second output member, wherein activation of said electromagnetic coil is operable for causing said second screw member to move axially relative to said first screw member so as to exert a clutch engagement force on said friction clutch assembly for transferring drive torque from said first output shaft to said second output shaft.

12. The power transmission device of claim 10 wherein said ballscrew operator further includes balls retained between aligned threads formed in said first and second screw members.

13. The power transmission device of claim 10 further comprising a resilient coupling mechanism for providing a drag force between said first screw member and said output member which causes said first screw member to rotate with said output member until a reaction force applied to said rotor upon activation of said coil causes said first screw member to rotate relative to said output member.

14. The power transmission device of claim 10 wherein said friction clutch assembly includes a first clutch member driven by said first output member, a second clutch member driving said second output member, a clutch pack operably interleaved between said first and second clutch members, an apply plate moveable relative to said clutch pack in response to movement of said second screw member, and a case member fixed for rotation with said first clutch member and having spaced segments defining said chamber within which said first portion of said rotor is disposed.

15. The power transmission device of claim 14 wherein said electromagnetic coil is fixed to a non-rotational housing and is located in proximity to said spaced segments of said case member, whereby activation of said coil creates a magnetic field which causes the viscosity of said magnetorheological fluid to increase for resisting relative rotation between said case member and said rotor.

16. The power transmission device of claim 10 further comprising:
   sensors for detecting certain operational characteristics of the motor vehicle and generating sensor signals that are received by said controller; and
   a mode select mechanism for permitting selection of first and second operational drive modes and generating mode signals received by said controller.

17. The power transmission device of claim 16 wherein said first operational drive mode is an adaptive mode where said controller adaptively regulates the value of control signals sent to said coil for variably controlling the value of said clutch engagement force generated by said ballscrew operator.

18. A motor vehicle comprising:
   a powertrain for generating drive torque;
   a first driveline including a first differential driving a pair of first wheels;
   a second driveline including a second differential driving a pair of second wheels; and
   a power transmission device having an input interconnecting said powertrain to said first differential, an output interconnected to said second differential, and a torque transfer mechanism operable for transferring drive torque from said input to said output, said torque transfer mechanism including a friction clutch assembly operably disposed between said input and said output, a ballscrew operator having a first screw member mounted on said output and a second screw member supported for axial movement relative to said first screw member for generating a clutch engagement force to be applied to said friction clutch assembly, a rotor having a first portion fixed to said first screw member and a second portion disposed in a chamber filled with magnetorheological fluid, an electromagnetic coil arranged to vary the viscosity of said magnetorheological fluid in response to control signals, and a controller for generating said control signals.

19. The motor vehicle of claim 18 wherein said power transmission device is a transfer case having:

an input shaft driven by said powertrain;

a first output shaft interconnecting said input shaft to a first prop shaft connected to said first differential; and a second output shaft driving a second prop shaft connected to said second differential wherein said torque transfer mechanism is operable to selectively transfer drive torque from said first output shaft to said second output shaft.

20. The motor vehicle of claim 18 wherein said power transmission device is a transfer unit having its input driving said first differential and its output driving said second differential.

21. The motor vehicle of claim 18 wherein said ballscrew operator further includes balls retained between aligned threads formed in said first and second screw members.

22. The motor vehicle of claim 18 further comprising a resilient coupling mechanism for providing a predetermined drag force between said first screw member and said output member which causes said first screw member to rotate with said output member until a reaction force applied to said rotor upon activation of said coil causes said first screw member to rotate relative to said output member.

23. The motor vehicle of claim 18 wherein said friction clutch assembly includes a first clutch member driven by said first output member, a second clutch member driving said second output member, a clutch pack operably interleaved between said first and second clutch members, an apply plate moveable relative to said clutch pack in response to movement of said second screw member, and a case member fixed for rotation with said first clutch member and having spaced segments defining said chamber within which said first portion of said rotor is disposed.

24. The motor vehicle of claim 23 wherein said electromagnetic coil is fixed to a non-rotational housing and is located in proximity to said spaced segments of said case member, whereby activation of said coil creates a magnetic field which causes the viscosity of said magnetorheological fluid to increase for resisting relative rotation between said case member and said rotor.

25. The motor vehicle of claim 18 further comprising:

sensors for detecting certain operational characteristics of the motor vehicle and generating sensor signals that are received by said controller; and a mode select mechanism for permitting selection of first and second operational drive modes and generating mode signals received by said controller.

26. A transfer case for use in a motor vehicle having a powertrain and first and second drivelines, comprising:

a first shaft driven by the powertrain and adapted for connection to the first driveline;

a second shaft adapted for connection to the second driveline;

a torque transfer mechanism operable for transferring drive torque from said first shaft to said second shaft, said torque transfer mechanism including an input member driven by said first shaft, an output member driving said second shaft, a friction clutch assembly operably disposed between said input member and said output member, a ballscrew operator having a first screw mounted on said output member and a second screw supported for axial movement relative to said first screw for applying a clutch engagement force on said friction clutch assembly, and a clutch actuator having a rotor fixed for rotation with said first screw with an end portion of said rotor disposed within a chamber filled with a magnetorheological fluid, and an electromagnetic coil arranged to vary the viscosity of the fluid in said chamber in response to electric control signals; and a controller for generating said electric control signals.

27. The transfer case of claim 26 wherein said ballscrew operator further includes balls retained between aligned threads formed in said first and second screw members.

28. The transfer case of claim 26 further comprising a resilient coupling mechanism for providing a drag force between said first screw member and said output member for causing said first screw member to rotate with said output member until a force applied to said rotor upon activation of said coil causes said first screw member to rotate relative to said output member.

29. The power transmission device of claim 26 wherein said friction clutch assembly includes a first clutch member driven by said input member, a second clutch member driving said output member, a clutch pack operably interleaved between said first and second clutch members, an apply plate moveable relative to said clutch pack in response to movement of said second screw member, and a case member fixed for rotation with said first clutch member and having spaced segments defining said chamber within which said end portion of said rotor is disposed.

30. The power transmission device of claim 29 wherein said electromagnetic coil is fixed to a non-rotational housing and is located in proximity to said spaced segments of said case member, whereby activation of said coil creates a magnetic field which causes the viscosity of said magnetorheological fluid to increase for resisting relative rotation between said case member and said rotor.

31. The power transmission device of claim 26 wherein said controller establishes the value of said electric control signal based on a rotary speed difference between said input member and said output member, and wherein said control signal is operable to vary the viscosity of said magnetorheological fluid in said chamber which results in axial movement of said second screw member relative to said friction clutch assembly.

32. A transfer case for use in a motor vehicle having a powertrain and first and second drivelines, comprising:

an input shaft driven by the powertrain;

a first output shaft adapted for connection to the first driveline;

a second output shaft adapted for connection to the second driveline;

an interaxle differential operably interconnecting said input shaft to said first and second output shafts;

a torque transfer mechanism operable for limiting speed differentiation between said first and second output shafts, said torque transfer mechanism including a first member coupled to said first output shaft, a second member coupled to second output shaft, a friction clutch assembly operably disposed between said first member and said second member, and a clutch actuator operable for applying a clutch engagement force on said friction clutch assembly; said clutch actuator including a ballscrew operator having a first screw mounted on said second member and a second screw supported for axial movement relative to said first screw for applying said clutch engagement force on said friction clutch assembly, a rotor fixed for rotation with said first screw and having an end portion disposed within a chamber filled with a magnetorheological fluid, and an electromagnetic coil arranged to vary the viscosity of said fluid in said chamber in response to electric control signals; and a controller for generating said electric control signals.

33. The transfer case of claim 32 wherein said controller establishes the value of said electric control signal based on a rotary speed difference between said first output shaft and said second output shaft, and wherein said control signal is operable to vary the viscosity of said magnetorheological fluid in said chamber for causing relative rotation between said first and second screw member which results in axial movement of said second screw member relative to said friction clutch assembly.

* * * * *